United States Patent
Sekihara et al.

(10) Patent No.: US 10,479,195 B2
(45) Date of Patent: Nov. 19, 2019

(54) FUEL SUPPLY DEVICE

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Atsushi Sekihara, Kiyosu (JP); Satoshi Suzuki, Kiyosu (JP); Shinji Shimokawa, Seto (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 117 days.

(21) Appl. No.: 15/801,992

(22) Filed: Nov. 2, 2017

(65) Prior Publication Data

US 2018/0126842 A1 May 10, 2018

(30) Foreign Application Priority Data

Nov. 7, 2016 (JP) .................................. 2016-216845

(51) Int. Cl.
*B60K 15/03* (2006.01)
*B60K 15/035* (2006.01)
*B60K 15/04* (2006.01)

(52) U.S. Cl.
CPC ............ *B60K 15/035* (2013.01); *B60K 15/04* (2013.01); *B60K 2015/03538* (2013.01); *B60K 2015/03552* (2013.01); *B60K 2015/0458* (2013.01)

(58) Field of Classification Search
CPC ................. B60K 15/04; B60K 15/035; B60K 2015/03528; B60K 2015/03538; B60K 2015/03552

(Continued)

(56) References Cited

U.S. PATENT DOCUMENTS 4,809,865 A * 3/1989 Mori ................ B60K 15/03504
123/519
7,055,557 B1 * 6/2006 Jahnke ............ B60K 15/03519
141/301

(Continued)

FOREIGN PATENT DOCUMENTS

JP 2011-133003 A 7/2011
JP 2014-069619 A 4/2014

(Continued)

OTHER PUBLICATIONS

Office Action dated Sep. 18, 2018 issued in corresponding JP patent application No. 2016-216845 (and English translation).

*Primary Examiner* — Timothy L Maust
(74) *Attorney, Agent, or Firm* — Posz Law Group, LLP

(57) ABSTRACT

The fuel supply device comprises a filler neck provided to include a fuel supply port which a fueling gun is inserted in and configured to form part of a fuel passage from the fuel supply port to a fuel tank, a fuel vapor pipe connected with the fuel tank and with a fuel vapor port and configured to supply a fuel vapor in the fuel tank to an internal passage of the filler neck main body, and a buffer member at least partly placed between a filler neck main body and the fuel vapor port in a neighborhood of a branch portion where the fuel vapor port is branched off from the filler neck main body. The filler neck comprises the filler neck main body including the internal passage and the fuel vapor port branched off from the filler neck main body.

8 Claims, 10 Drawing Sheets

(58) Field of Classification Search
USPC .......................................................... 141/350
See application file for complete search history.

(56) References Cited

U.S. PATENT DOCUMENTS

| | | | | |
|---|---|---|---|---|
| 7,614,431 | B2* | 11/2009 | Basista | F02M 37/20 |
| | | | | 123/518 |
| 9,404,446 | B2* | 8/2016 | Fujiwara | F02M 25/0854 |
| 9,457,649 | B2* | 10/2016 | Fujiwara | B60K 15/04 |
| 9,764,637 | B2* | 9/2017 | Brown | B60K 15/035 |
| 9,908,405 | B2* | 3/2018 | Kito | B60K 15/05 |
| 10,150,061 | B2* | 12/2018 | Steinmann | B01D 19/0031 |
| 2015/0352948 | A1 | 12/2015 | Kito | |

FOREIGN PATENT DOCUMENTS

| | | |
|---|---|---|
| JP | 2015-182533 A | 10/2015 |
| JP | 2016-013827 A | 1/2016 |

\* cited by examiner

FUEL SUPPLY DEVICE

CROSS-REFERENCE TO RELATED APPLICATION

The present application claims priority from Japanese patent application 2016-216845 filed on Nov. 7, 2016, the entirety of the content of which is hereby incorporated by reference into this application.

BACKGROUND

Field

The present disclosure relates to a fuel supply device configured to supply a fuel to a fuel tank.

Related Art

A proposed configuration of a fuel supply device to supply a fuel to a fuel tank placed in a vehicle or the like includes a filler neck that has an opening in which a fueling gun is inserted and that forms a fuel passage to introduce the fuel supplied from the fueling gun to the fuel tank; and a fuel vapor pipe (breather pipe) configured to return the fuel vapor in the fuel tank to the filler neck (as described in, for example, JP 2016-13827A). The fuel vapor pipe is connected with a fuel vapor port branched off from a filler neck main body, such as to cause the inside of the fuel tank to communicate with the fuel passage inside of the filler neck main body. The fuel supply device described in JP 2016-13827A is provided with a protective portion configured to cover a branch portion where the fuel vapor port is branched off from the filler neck main body and thereby suppress the branch portion from being damaged by application of an external force to the branch portion.

The protective portion of JP 2016-13827A is simply configured to collectively surround, in the circumferential direction, the filler neck main body and the fuel vapor port (and a portion of the fuel vapor pipe connected with the fuel vapor port) in the neighborhood of the branch portion. When a significant external force is applied to the fuel vapor port via the protective portion, the fuel vapor port receives a major part of this external force. This causes a problem of plastic deformation of the fuel vapor port or damage of the branch portion. In the fuel supply device, there is accordingly a need for a technique that suppresses plastic deformation of the fuel vapor port and damage of the branch portion when an external force is applied.

SUMMARY

According to one aspect of the present disclosure, there is provided a fuel supply device configured to supply a fuel to a fuel tank. The fuel supply device comprises a filler neck provided to include a fuel supply port which a fueling gun is inserted in and configured to form part of a fuel passage from the fuel supply port to the fuel tank, wherein the filler neck comprises a filler neck main body including an internal passage that forms part of the fuel passage, and a fuel vapor port branched off from the filler neck main body to communicate with the internal passage of the filler neck main body; a fuel vapor pipe connected with the fuel tank and with the fuel vapor port and configured to supply a fuel vapor in the fuel tank to the internal passage of the filler neck main body; and a buffer member at least partly placed between the filler neck main body and the fuel vapor port in a neighborhood of a branch portion where the fuel vapor port is branched off from the filler neck main body.

BRIEF DESCRIPTION OF DRAWINGS

FIG. 1 is a schematic diagram illustrating a fuel supply device which a buffer member according to one embodiment of the present disclosure is applied to;

DESCRIPTION OF EMBODIMENTS

A. First Embodiment

A1. General Configuration

Figure 1:
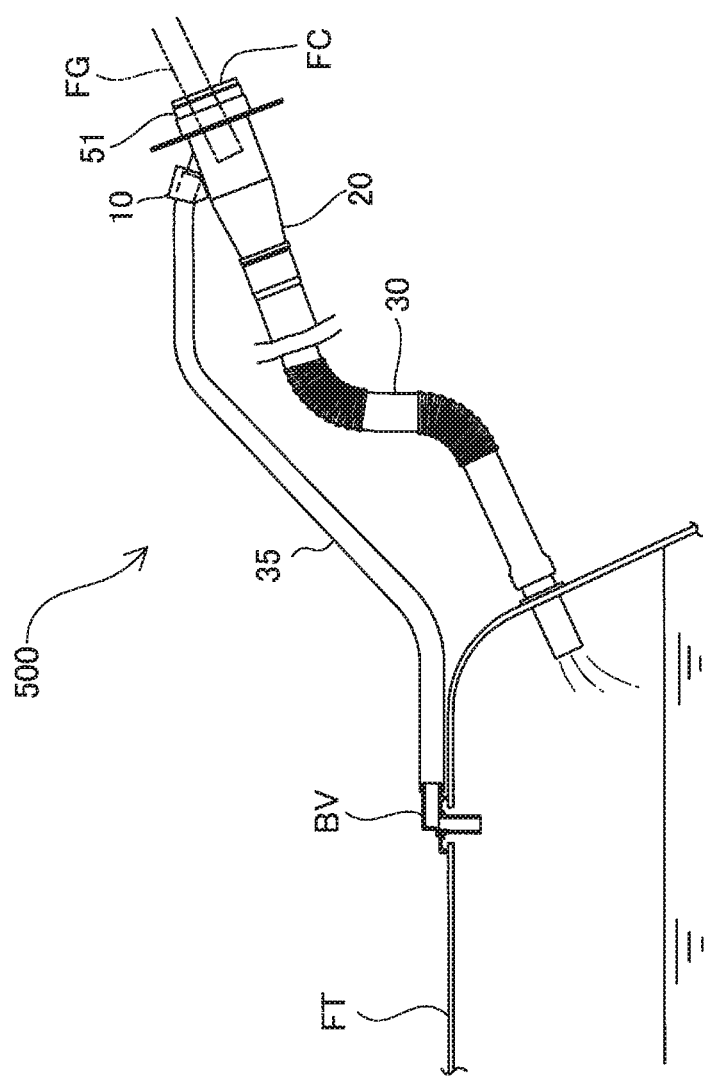

FIG. 1 is a schematic diagram illustrating a fuel supply device 500 which a buffer member 10 according to one embodiment of the present disclosure is applied to. The fuel supply device 500 is connected with a fuel tank FT and is configured to supply a fuel discharged from a fueling gun FG that is inserted in the fuel supply device 500, into the fuel tank FT. According to this embodiment, the fuel tank FT is mounted on a vehicle. The fuel tank FT may not be necessarily mounted on the vehicle but may be installed in a stationary manner in a building.

The fuel supply device 500 includes a fuel pipe 30 having one end that is placed inside of the fuel tank FT, a filler neck 20 attached to the other end of the fuel pipe 30, a retainer 51 attached to an opposite end of the filler neck 20 that is opposite to the end of the filler neck 20 which the fuel pipe 30 is attached to, a fuel vapor pipe 35 having one end that is attached to the fuel tank FT via a valve device BV and the other end that is connected with the filler neck 20, and the buffer member 10.

The fuel pipe 30 forms one part of a fuel passage from a fuel supply port FC in which the fueling gun FG is inserted to the fuel tank FT (hereinafter simply referred to as "fuel passage"). According to this embodiment, the filler pipe 30 is a resin tubular body and is pressed in a fir tree portion of the filler neck 20.

Figure 2:
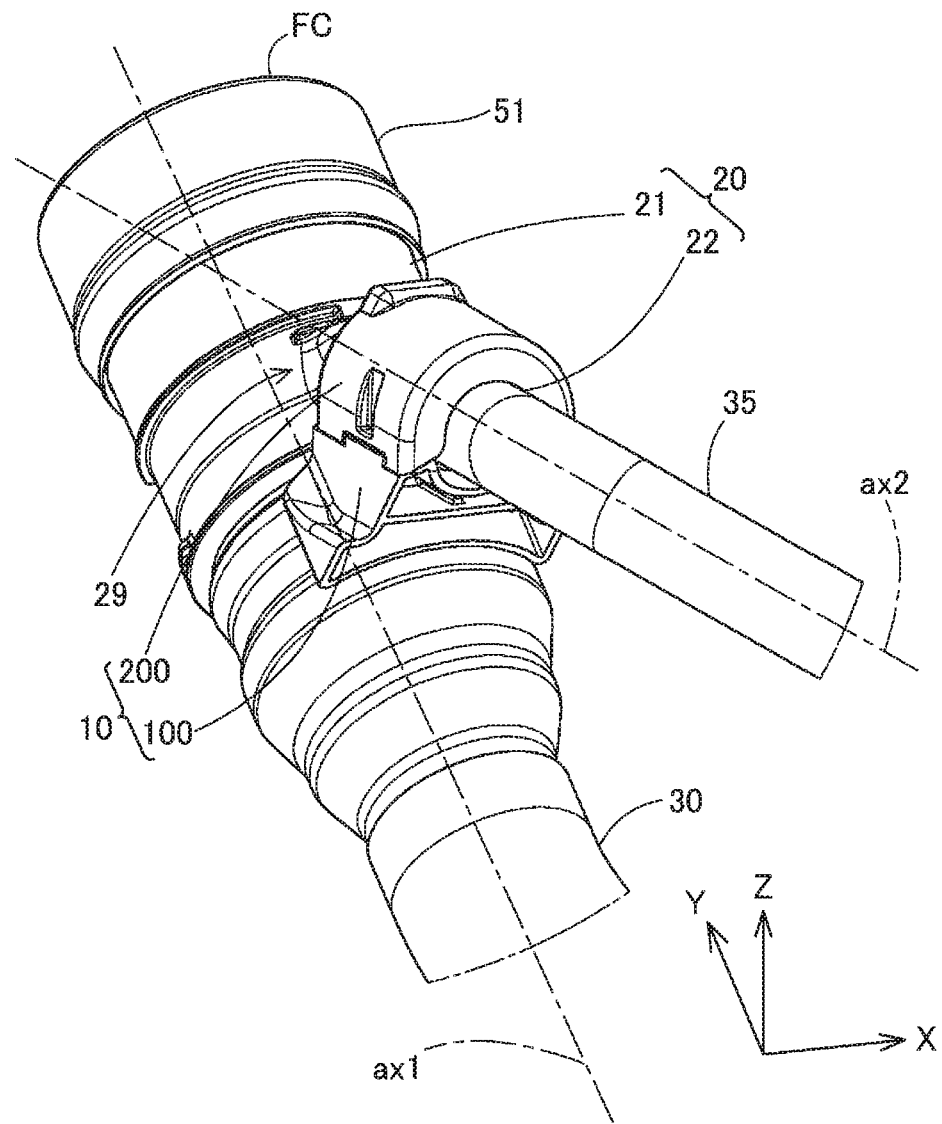
FIG. 2 is a first perspective view illustrating the external shape of a filler neck.
Figure 3:
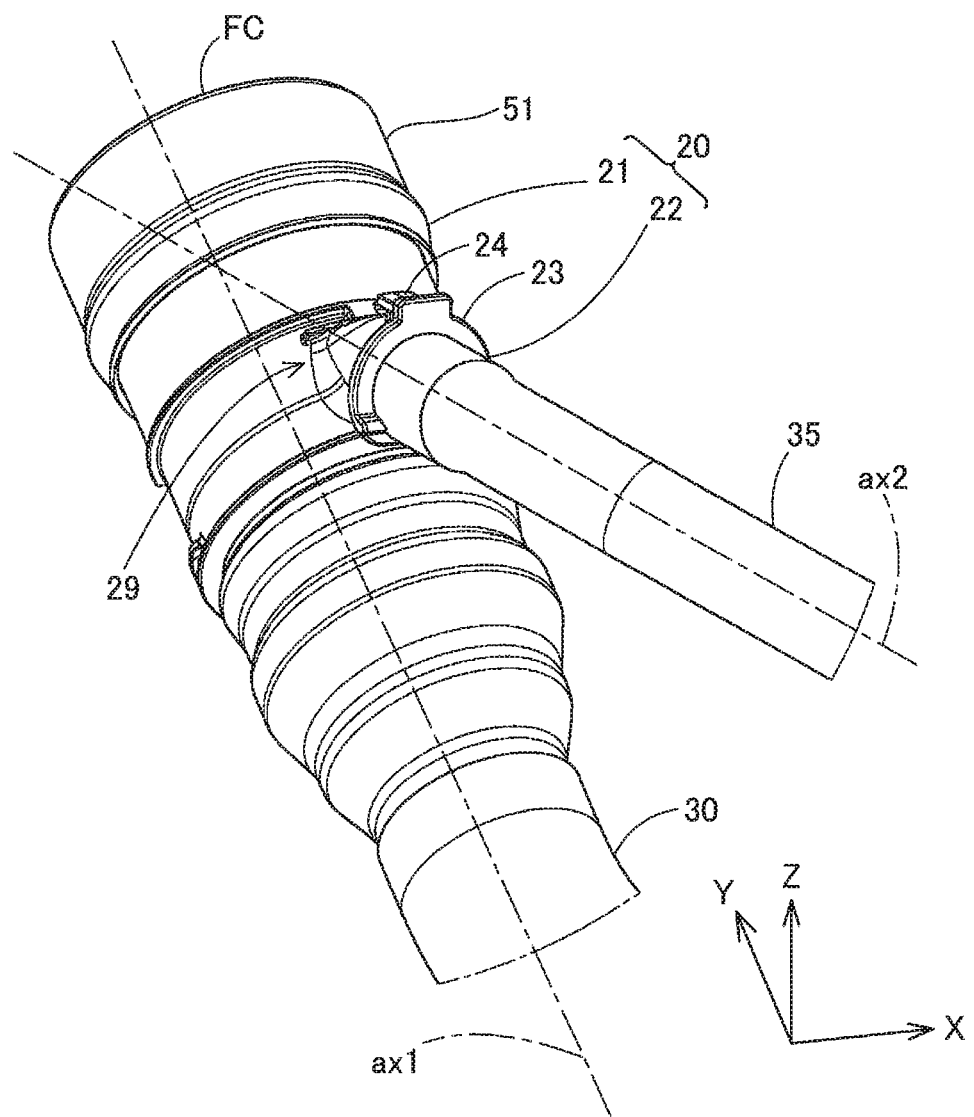
FIG. 3 is a second perspective view illustrating the external shape of the filler neck.
Figure 4:
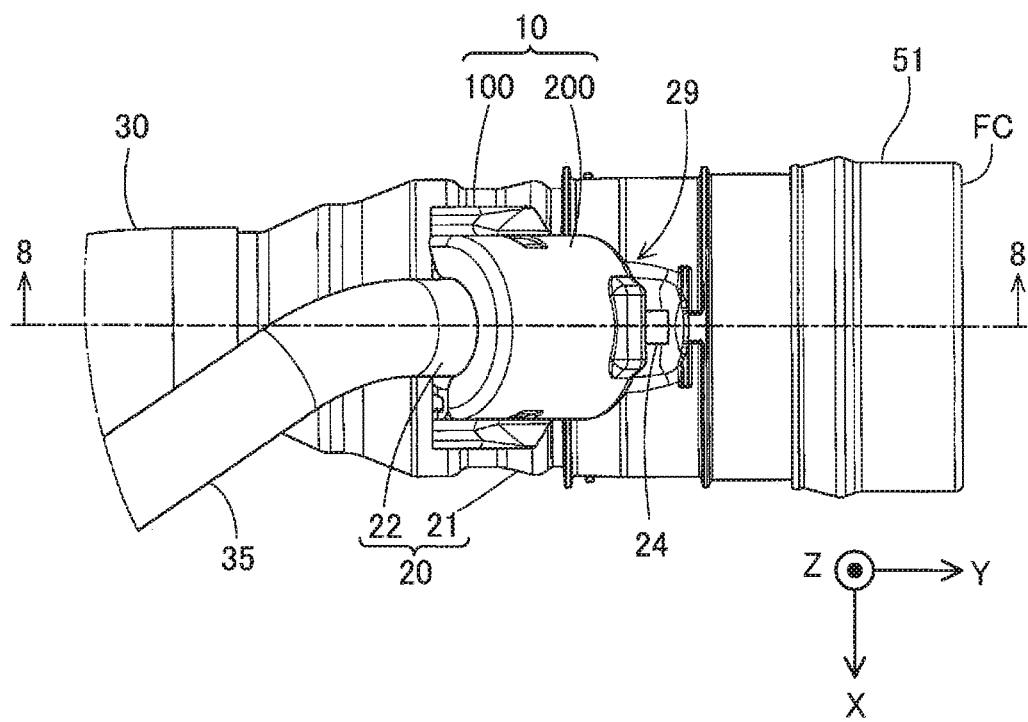
FIG. 4 is a plan view illustrating the external shape of the filler neck.

FIG. 2 is a first perspective view illustrating the external shape of the filler neck 20. FIG. 3 is a second perspective view illustrating the external shape of the filler neck 20. FIG. 4 is a plan view illustrating the external shape of the filler neck 20. FIGS. 2 to 4 also illustrate the retainer 51, part of the fuel pipe 30 and part of the fuel vapor pipe 35, in addition to the filler neck 20. FIG. 2 and FIG. 4 illustrate the filler neck 20 which the buffer member 10 is attached to FIG. 3, on the other hand, illustrates the filler neck 20 which the buffer member 10 is detached from. Among an X axis, a Y axis and a Z axis orthogonal to one another shown in FIG. 2, the Y axis is parallel to an axis line ax1 of a filler neck main body 21 (described later) included in the filler neck 20. The X axis, the Y axis and the Z axis shown in other drawings including FIG. 3 and FIG. 4 correspond to the X axis, the Y axis and the Z axis shown in FIG. 2.

The filler neck 20 forms part of the fuel passage. As shown in FIGS. 2 to 4, the filler neck 20 includes the filler neck main body 21 and a fuel vapor port 22.

As shown in FIGS. 2 to 4, the filler neck main body 21 is formed in a tubular shape and includes an internal passage (not shown in FIGS. 2 to 4) (internal passage 27 described later) that forms part of the fuel passage. The retainer 51 made of a metal is mounted to one end of the filler neck main body 21. The retainer 51 is mounted to surround the entire circumference of an opening end of the filler neck main body 21. The retainer 51 forms the fuel supply port FC which the fueling gun FG is inserted in. A threaded portion (not shown) is formed on an inner circumferential face of the retainer 51, and a cap (not shown) is screwed to this threaded portion, so as to be detachably mounted to the fuel supply device 500. An opposite end of the filler neck main body 21 that is opposite to the end which the retainer 51 is mounted to, is inserted into the fuel pipe 30. This configuration causes the internal passage (internal passage 27 described later) of the filler neck main body 21 to communicate with the fuel pipe 30. A branch portion 29 where the fuel vapor port 22 is branched off from the filler neck main body 21 is also formed in the filler neck main body 21. According to this embodiment, the filler neck main body 21 is made of a resin material having excellent fuel permeation resistance, for example, a polyamide (PA) such as nylon-12, The filler neck main body 21 may, however, be not necessarily made of the polyamide but may be made of any type of resin.

As shown in FIG. 3, the fuel vapor port 22 is formed in a tubular shape and is branched off from the filler neck man body 21 (more specifically, from its branch portion 29). According to this embodiment, the fuel vapor port 22 and the filler neck main body 21 are formed integrally. In other words, the fuel vapor port 22 is formed from the same resin material as that of the filler neck main body 21. The fuel vapor port 22 is arranged to communicate with the fuel vapor pipe 35 and is configured to supply the fuel vapor supplied from the fuel tank FT via the fuel vapor pipe 35, into the internal passage (internal passage 27 described later) of the filler neck main body 21. The fuel vapor port 22 is protruded from an outer circumferential surface of the filler neck main body 21, such that an axis line ax2 of the fuel vapor port 22 intersects with the axis line ax1 of the filler neck main body 21 at a predetermined angle smaller than 90 degrees. An opposite end of the fuel vapor port 22 that is opposite to the end connected with the branch portion 29 is fit in an end of the fuel vapor pipe 35. As shown in FIG. 3, the fuel vapor port 22 includes an engagement protruded portion 23 and an engagement portion 24. The engagement protruded portion 23 engages with a cover portion (cover portion 200 described later) of the buffer member 10. The engagement portion 24 engages with a stopper (not shown). This stopper (not shown) is a member that is connected with the vehicle body and thereby serves to prevent the filler neck main body 21 from being expanded by heat and ejected out of the vehicle body.

As shown in FIG. 1, the fuel vapor pipe 35 is connected with the fuel tank FT and with the fuel vapor port 22 of the filler neck 20, such as to supply the fuel vapor in the fuel tank FT into the internal passage (internal passage 27 described later) of the filler neck main body 21. The fuel vapor pipe 35 is connected with the fuel tank FT via the valve device BY provided in the fuel tank FT. The valve device BV serves to suppress fluids such as the fuel, the fuel vapor and the air from flowing through the fuel vapor pipe 35 into the fuel tank FT. The fuel vapor pipe 35 may be made of, for example, a resin.

As shown in FIG. 2 and FIG. 4, at east part of the buffer member 10 is placed between the filler neck main body 21 and the fuel vapor port 22 in a neighborhood of the branch portion 29 of the filler neck main body 21. The buffer member 10 is arranged to surround the entire circumference of the neighborhood of the branch portion 29 of the fuel vapor port 22. The "neighborhood of the branch portion 29" herein denotes either a region that adjoins to the branch portion 29 and is within a predetermined first distance from the branch portion 29 or a region that is away from the branch portion 29 by a second distance or less and is within the predetermined first distance from the branch portion 29. The above first distance may be, for example, a distance 1.5 times the length of the fuel vapor port 22 along the axis line ax2. The above second distance may be, for example, a distance 0.5 times the length of the fuel vapor port 22 along the axis line ax2. When an external force is applied to the neighborhood of the branch portion 29 due to, for example, a collision of the vehicle, the buffer member 10 serves to absorb part of the external force and transmit part of the external force to the filler neck main body 21. As shown in FIG. 2 and FIG. 4, the buffer member 10 includes a main body portion 100 and a cover portion 200. The main body portion 100 is placed between the fuller neck main body 21 and the fuel vapor port 22. The cover portion 200 is arranged to cover an opposite side of the fuel vapor port 22 that is opposite to the side facing the filler neck main body 21, and is engaged with the filler neck main body 21.

A2. Detailed Configuration of Buffer Member 10

Figure 5:
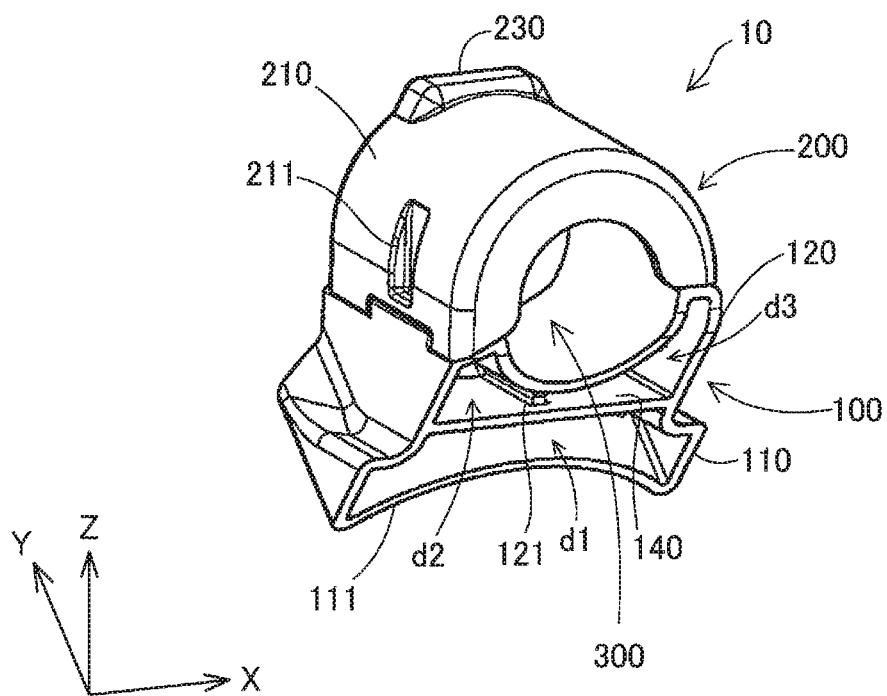
FIG. 5 is a perspective view illustrating the detailed configuration of the buffer member.
Figure 6:
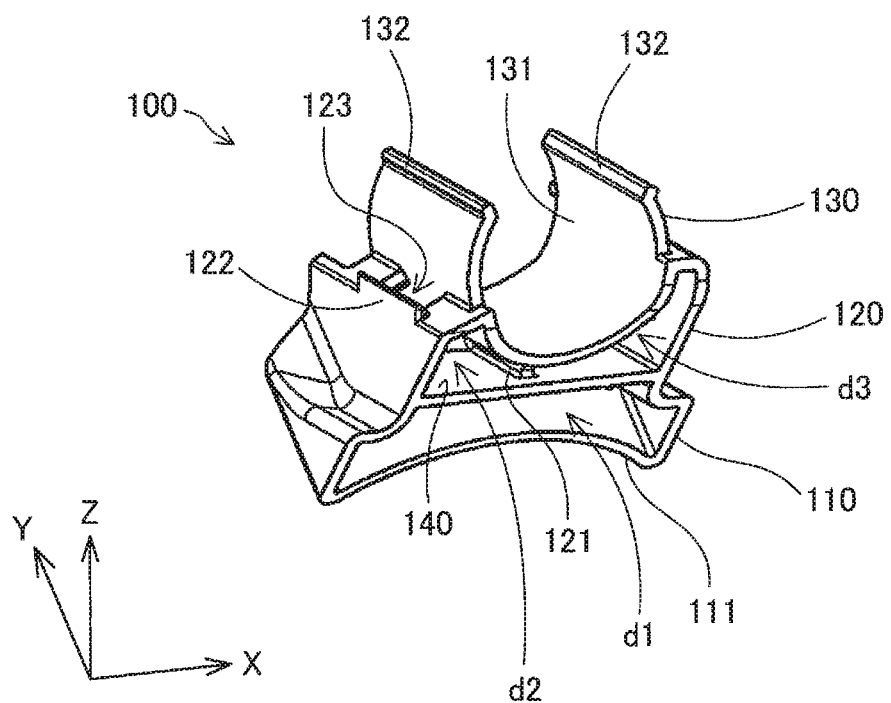
FIG. 6 is a perspective view illustrating the detailed configuration of a main body portion of the buffer member.
Figure 7:
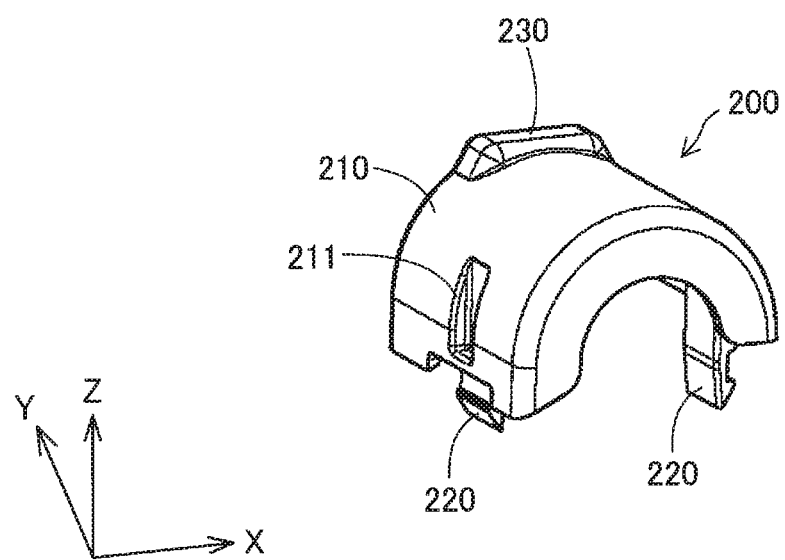
FIG. 7 is a perspective view illustrating the detailed configuration of a cover portion of the buffer member.

FIG. 5 is a perspective view illustrating the detailed configuration of the buffer member 10. FIG. 6 is a perspective view illustrating the detailed configuration of the main body portion 100 of the buffer member 10. FIG. 7 is a perspective view illustrating the detailed configuration of the cover portion 200 of the buffer member 10. As shown in FIG. 5, in the state that the main body portion 100 and the cover portion 200 are engaged with each other, a through hole 300 in a cylindrical shape is formed between the main body portion 100 and the cover portion 200. In the state that the buffer member 10 is mounted in the neighborhood of the branch portion 29, the fuel vapor port 22 is inserted in this through hole 300. Both the main body portion 100 and the cover portion 200 are made of a resin. According to this embodiment, the resin used may be polyethylene (PE). Using polyethylene enhances the elasticity of the buffer member 10, compared with the elasticity of the filler neck 20 made of polyamide. The resin used may not be necessarily limited to polyethylene but may be any type of resin.

As shown in FIG. 5 and FIG. 6, the main body portion 100 includes a first base portion 110, a second base portion 120 and a fuel vapor port support portion 130.

The first base portion 110 is located on a most −Z-direction side of the main body portion 100 and includes a −Z-direction side face (bottom face) 111 formed as a curved surface. This bottom face 111 is formed as a curved surface along the outer circumferential surface of a portion of the filler neck main body 21 to which the buffer member 10 is mounted. The first base portion 110 includes a first recess d1. This first recess d1 is open on its −Y-direction side. More strictly, the first recess d1 is not only open on the −Y-direction side but is open in a direction including an X-axis direction component or a Z-axis direction component. In other words, the main body portion 100 includes the first recess d1 that is open on a side furthest away from the branch portion 29 along at least one of the axis line ax1 of the filler neck main body 21 and the axis line ax2 of the fuel vapor port 22. The first recess d1 occupies a significantly large region of the first base portion 110. The first recess d1 is in a bottomed tubular shape formed from thin walls as the approximate external shape. The first base portion 110 has the thickness (thicknesses of respective wall portions constituting the first base portion 110) that is approximately uniform at any position. The length in the X-axis direction of the first base portion 110 is largest at a −Z-direction end and smallest at a +Z-direction end.

In the main body portion 100, the second base portion 120 is located on the +Z-direction side of the first base portion 110 such as to adjoin to the first base portion 110. A bottom portion of the second base portion 120 also serves as a ceiling portion of the first base portion 110. In other words, the second base portion 120 and the first base portion 110 are parted by a thin plate-like wall portion 140 that is arranged parallel to an X-Y plane. The second base portion 120 includes two recesses (second recess d2 and third recess d3). These two recesses d2 and d3 are open on their −Y-direction sides, like the first recess d1. In other words, the second base portion 120 includes the second recess d2 and the third recess d3 that are open on sides furthest away from the branch portion 29 along at least one of the axis line ax1 of the filler neck main body 21 and the axis line ax2 of the fuel vapor port 22. The second recess d2 and the third recess d3 are arrayed in the X-axis direction across a rib 121. The rib 121 has a thin plate-like external shape parallel to a Y-Z plane and is arranged to be continuous with the wall portion 140 on the boundary between the first base portion 110 and the second base portion 120 and with a bottom of the fuel vapor port support portion 130. Accordingly the rib 121 serves to separate and second recess d2 and the third recess d3 from each other. A major part of an upper side of the second recess d2 is covered by the bottom of the fuel vapor port support portion 130. An engagement hole 123 is formed in part of the upper side of the second recess d2. An engagement portion (engagement portion 220 described later) of the fuel vapor port support portion 130 is inserted in the engagement hole 123. The second base portion 120 has engagement portions 122 formed at the center in the Y-axis direction and at +Z-direction ends of connecting parts of the second base portion 120 connected with the fuel vapor port support portion 130. An engagement step (not shown) is provided on respective inner circumferential surfaces (surface facing the second recess d2 and surface facing the third recess d3) of the engagement portions 122. This engagement step of the engagement portion 122 is engaged with the engagement portion of the fuel vapor port support portion 130. The third recess d3 is provided to be symmetrical to the second recess d2 with respect to the rib 121. The configuration of the third recess d3 is similar to the configuration of the second recess d2, and its detailed description is omitted. The second base portion 120 has the thickness (thicknesses of respective wall portions constituting the second base portion 120) that is approximately uniform at any position and is approximately equal to the thickness of the first base portion 110. The configuration of the buffer member 10 having the three recesses d1, d2 and d3 as described above provides the entire buffer member 10 with high elasticity, compared with a configuration without such recesses d1, d2 and d3.

The fuel vapor port support portion 130 is arranged to cover part of a lower side (−Z direction side) of an outer circumferential surface of the fuel vapor port 22 and to hold and support this part. As shown in FIG. 6, the fuel vapor port support portion 130 has a cylindrical shape with a band-like cutout along the axis line direction as the approximate external shape. An inner circumferential surface 131 of the fuel vapor port support portion 130 is formed as a curved surface along the outer circumferential surface of the fuel vapor port 22 facing the filler neck main body 21. This inner circumferential surface 131 forms part of the through hole 300. +Z-direction ends of the fuel vapor port support portion 130, i.e., opening ends 132 of the fuel vapor port support portion 130, are folded outward and serve as a guide for insertion of the fuel vapor port 22 into the fuel vapor port support portion 130.

As shown in FIG. 5 and FIG. 7, the cover portion 200 is formed in a half cylindrical shape along the axis line as the approximate external shape. The cover portion 200 is arranged to cover an opposite side of the fuel vapor port 22 that is opposite to the side facing the filler neck main body 21 and is used in engagement with the main body portion 100. The cover portion 200 includes a main part 210 and a pair of engagement portions 220. The main part 210 and the pair of engagement portions 220 are formed integrally.

The main part 210 is formed in a half cylindrical shape along the axis line as the approximate external shape and is arranged to cover the fuel vapor port 22 in the neighborhood of the branch portion 29. The main part 210 has the thickness that is approximately uniform at any position, which is approximately equal to the thicknesses of the respective wall portions constituting the first base portion 110 and the respective wall portions constituting the second base portion 120. An engagement cover portion 230 is formed at a +Y-direction end of the main part 210 to be protruded in the +Z-direction. The engagement cover portion 230 is provided to cover the engagement protruded portion 23. Through holes 211 are formed on respective sides (+X-direction side and −X-direction side) of the main part 210 to pass through the main part 210 in the thickness direction.

The pair of engagement portions 220 are provided at the approximate center in the Y-axis direction of the main part 210 to be continuous with two −Z-direction ends of the main part 210 (two ends on the side facing the main body portion 100). Each of the engagement portions 220 is formed from a thin plate-like member that is protruded in the −Z-direction. In the state that the main body portion 100 and the cover portion 200 are assembled, the respective engagement portions 220 are inserted into the engagement holes 123 formed in the main body portion 100, such that leading ends of the respective engagement portions 220 are engaged with the engagement steps of the respective engagement portions 122 described above.

The buffer member 10 is mounted to the filler neck 20 as described below. The main body portion 100 is placed between the filler neck main body 21 and the fuel vapor port 22 in the neighborhood of the branch portion 29. The fuel vapor port 22 is then inserted (fit) through the opening ends 132 of the fuel vapor port support portion 130 into the fuel vapor port support portion 130. The cover portion 200 is subsequently placed to cover the opposite side of the fuel vapor port 22 that is opposite to the side facing the filler neck main body 21, in the neighborhood of the branch portion 29. The engagement portions 220 are then inserted into the engagement holes 123 of the main body portion 100. This causes the main body portion 100 and the cover portion 200 to be engaged with each other and completes mounting of the buffer member 10 to the filler neck 20. The buffer member 10 is demounted from the filler neck 20 by a reverse procedure to the above mounting procedure. The configuration that the main body portion 100 and the cover portion 200 are provided as separate bodies facilitates the operation of mounting the buffer member 10 to the filler neck 20 and the operation of demounting the buffer member 10 from the filler neck 20.

A3. Behavior of Buffer Member 10 under Application of External Force

Figure 8:
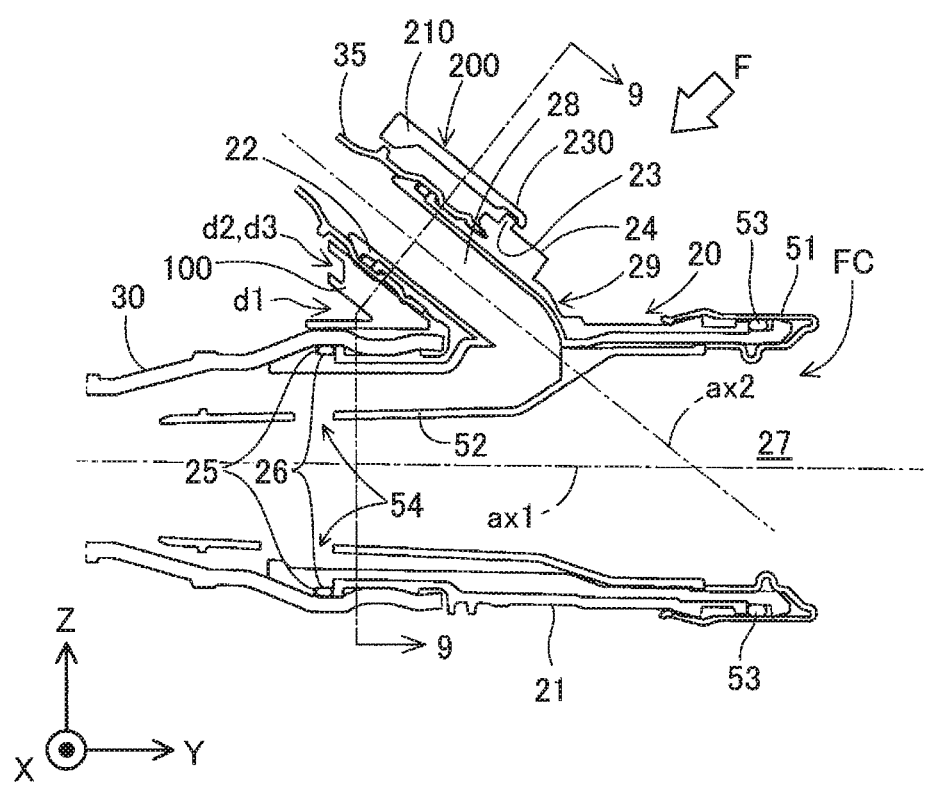
FIG. 8 is a sectional view illustrating an 8-8 section shown in FIG. 4.
Figure 9:
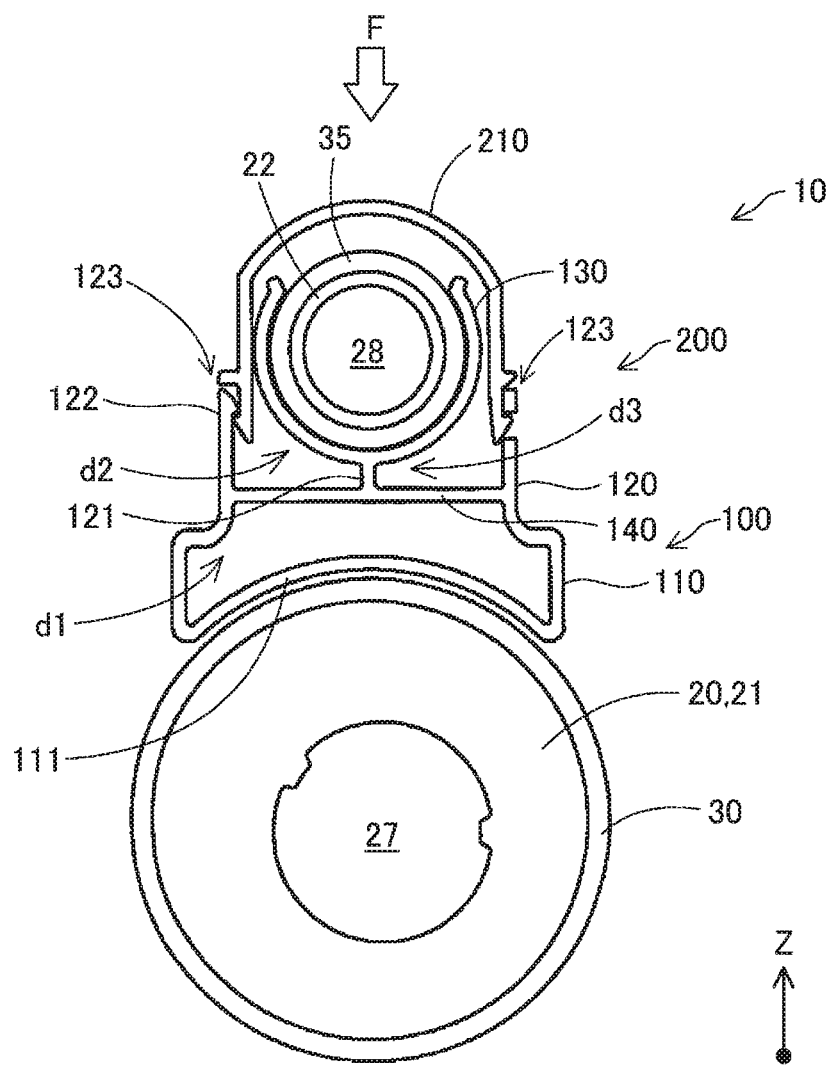
FIG. 9 is a sectional view illustrating a 9-9 section shown in FIG. 8.

FIG. 8 is a sectional view illustrating an 8-8 section shown in FIG. 4. FIG. 9 is a sectional view illustrating a 9-9 section shown in FIG. 8. FIG. 8 mainly illustrates a section of the filler neck 20 with the buffer member 10 mounted thereto, when being viewed in the −X-direction. This section is a surface of section including the axis line ax1 of the filler neck main body 21 and the axis line ax2 of the fuel vapor port 22.

As shown in FIG. 8, an annular seal member 53 is placed between the outer circumferential surface of a +Y-direction end of the filler neck main body 21 and the retainer 51. The seal member 53 serves to suppress leakage of the fuel along between the outer circumferential surface of the filler neck main body 21 and the retainer 51 to outside. According to this embodiment, the seal member 53 is configured by an O-ring made of rubber. A guide member 52 made of a resin is placed in a hollow portion of the filler neck main body 21. The guide member 52 is formed in a funnel-like external shape and serves to guide the direction of insertion of a leading end of the fueling gun FG inserted through the fuel supply port FC. The guide member 52 also includes an internal passage 27 that is formed inside of the filler neck main body 21 along the axis line ax1. A fuel supply port FC-side (+Y-direction side) end of the guide member 52 adjoins to a fuel tank FT-side (−Y-direction side) end of the retainer 51. A plurality of through holes 54 are formed at positions closer to a fuel tank FT-side (−Y-direction side) relative to the center of the guide member 52 along the Y axis. An internal passage (internal passage 28 described later) of the fuel vapor port 22 and the internal passage 27 of the filler neck main body 21 communicate with each other via, the plurality of through holes 54. An annular groove 25 is formed in the outer circumferential surface in the neighborhood of a fuel tank FT-side (−Y-direction side) end of the filler neck main body 21. The annular groove 25 is formed in a portion of the filler neck main body 21 inserted into the fuel pipe 30. An annular seal member 26 is fit in this annular groove 25. According to this embodiment, the seal member 26 is configured by an O-ring made of rubber, like the seal member 53 described above. The seal member 26 is placed between the filler neck main body 21 and the fuel pipe 30, so as to seal the filler neck main body 21 and the fuel pipe 30 from each other. A −Y-direction end of the main body portion 100 of the buffer member 10, i.e., an end of the main body portion 100 furthest away from the branch portion 29 along the axis line ax1 of the filler neck main body 21, is located at a portion further away from the branch portion 29 along the axis line ax1, compared with the seal member 26.

As shown in FIG. 8, an internal passage 28 is formed inside of the fuel vapor port 22. A +Y-direction and −Z direction end of the internal passage 28 is arranged to be continuous with an inner space of the filler neck main body 21. The fuel vapor supplied through the fuel vapor pipe 35 to the fuel vapor port 22 passes through the internal passage 28, flows into the inner space of the filler neck main body 21, and further flows into the internal passage 27 via the through holes 54 of the guide member 52 described above, so as to be joined with the fuel supplied from the fuel supply port FC.

As shown in FIG. 9 and FIG. 5, the buffer member 10 has a trapezoidal shape as the approximate external shape when being viewed in a direction (Y-axis direction) parallel to the axis line ax1 of the filler neck main body 21. This shape suppresses a significant increase in bulk of the buffer member 10 compared with, for example, a rectangular external shape viewed in the same direction, while suppressing reduction in the contact area of the buffer member 10 with the filler neck main body 21. This configuration accordingly suppresses interference of the buffer member 10 with members placed in the neighborhood of the buffer member 10.

For example, it is assumed that an external force F shown as an open arrow in FIG. 8 and FIG. 9 is applied to the neighborhood of the branch portion 29 in the fuel supply device 500. In the example of FIG. 8 and FIG. 9, the external force F denotes a force in a direction orthogonal to the axis line ax2 of the fuel vapor port 22. In this case, the cover portion 200 first receives the external force F. This suppresses the external force F from being applied directly to the fuel vapor port 22 and thereby suppresses damage of the fuel vapor port 22. Part of the external force F applied to the cover portion 200 is transmitted to the main body portion 100 that is engaged with the cover portion 200. The main body portion 100 is arranged to adjoin to the filler neck main body 21. Part of the force transmitted to the main body portion 100 is accordingly transmitted to the filler neck main body 21. The filler neck main body 21 has the larger diameter than that of the fuel vapor port 22 and has the higher rigidity than that of the fuel vapor port 22. The filler neck main body 21 is accordingly less likely to be damaged by application of the same magnitude of force, compared with the fuel vapor port 22.

The bottom face 111 of the main body portion 100 that adjoins to the filler neck main body 21 is formed as the curved surface along the outer circumferential surface of the filler neck main body 21. This configuration ensures the larger contact area of the buffer member 10 (first base portion 110) with the filler neck main body 21, compared with a configuration that is not formed as a curved surface (more specifically, compared with a configuration that has the same area but is not formed as a curved surface along the outer circumferential surface of the filler neck main body 21). This configuration accordingly enables part of the force applied to the buffer member 10 to be transmitted over the wide range of the filler neck main body 21. This accordingly suppresses the external force from being locally transmitted to the filler neck main body 21 and thereby suppresses damage of the filler neck main body 21.

The cover portion 200 that directly receives the external force is formed from a thin material of uniform thickness and is thus readily deformable. Deformation of the cover portion 200 absorbs part of the external force F. The first base portion 110 includes the first recess d1. This allows the wall portion 140 on the boundary between the first base portion 110 and the second base portion 120 to be bent toward the first recess d1. Such flexure absorbs part of the force transmitted from the second base portion 120 to the first base portion 110. Similarly, the second base portion 120 includes the second recess d2 and the third recess d3. This allows the fuel vapor port support portion 130 to be bent toward the second recess d2 and the third recess d3. When the cover portion 200 is deformed downward to come into contact with the fuel vapor port 22 and presses the fuel vapor port support portion 130 down, this configuration allows the fuel vapor port support portion 130 to be bent toward the second recess d2 and the third recess d3 and thereby absorbs part of the force applied to the fuel vapor port support portion 130. The bottom of the fuel vapor port support portion 130 is connected with the wall portion 140 on the boundary between the second base portion 120 and the first base portion 110 by the rib 121. This configuration enables part of the force applied to the fuel vapor port support portion 130 to be transmitted via the rib 121 to the wall portion 140 and to be absorbed by flexure of the wall portion 140. This configuration causes part of the external force F to be absorbed by the buffer member 10 and thereby reduces the force transmitted to the fuel vapor port 22, compared with a configuration of the main body portion 100 having small flexure.

In the fuel supply device 500 of the first embodiment described above, the main body portion 100 as part of the buffer member 10 is placed between the filler neck main body 21 and the fuel vapor port 22 in the neighborhood of the branch portion 29. When the external force F is applied to the fuel vapor port 22, this configuration causes part of the external force F to be absorbed by the buffer member 10 and to be transmitted to the filler neck main body 21. This accordingly suppresses plastic deformation of the fuel vapor port 22 and damage of the branch portion 29.

In the fuel supply device 500, the buffer member 10 includes the three recesses d1 to d3 that are open on the sides furthest away from the branch portion 29 along a direction parallel to at least one of the axis line ax1 of the filler neck main body 21 and the axis line ax2 of the fuel vapor port 22. This configuration enhances the elasticity of the buffer member 10 and causes the buffer member 10 to more readily absorb the applied external force, compared with a configuration without the three recesses d1 to d3. This more effectively suppresses plastic deformation of the fuel vapor port 22 and damage of the branch portion 29.

In the fuel supply device 500, the buffer member 10 includes the three recesses d1 to d3 that are parted by the rib 121. This configuration enhances the rigidity of the buffer member 10 and causes the buffer member 10 to more readily transmit the applied force to the filler neck main body 21, compared with a configuration having a single recess of a volume that is equal to the total volume of void spaces formed by the three recesses d1 to d3. This accordingly enables part of the force to be absorbed by the buffer member 10, while suppressing damage of the buffer member 10. Additionally, the presence of the rib 121 facilitates molding of the buffer member 10.

In the fuel supply device 500, the rib 121 has a surface parallel to the plane including the axis line ax1 of the filler neck main body 21 and the axis line ax2 of the fuel vapor port 22. This configuration causes the applied force to be more readily transmitted to the filler neck main body 21.

In the fuel supply device 500, the buffer member 10 has the contact surface (bottom face 111) formed as the curved surface along the outer circumferential surface of the filler neck main body 21. This configuration increases the contact area of the buffer member 10 with the filler neck main body 21 and enables the applied force to be transmitted to the wide range of the filler neck main body 21, compared with a configuration including a contact surface that is not formed as a curved surface, for example, a planar contact surface of the same area. This accordingly suppresses the filler neck main body 21 from being damaged by the locally transmitted force.

In the fuel supply device 500, the end of the buffer member 10 furthest away from the branch portion 29 along the axis line ax1 of the filler neck main body 21 is located at the position further away from the branch portion 29 along the axis line ax1 of the filler neck main body 21, compared with the seal member 26. This configuration enables the portion of the filler neck main body 21 with the seal member 26 placed on its outer circumferential surface to be covered by the buffer member 10 and thereby suppresses this portion from being damaged by application of an external force. This accordingly suppresses reduction in the sealing property between the filler neck main body 21 and the fuel vapor port 22.

In the fuel supply device 500, the buffer member 10 has the trapezoidal external shape when being viewed in the direction parallel to the axis line ax1 of the filler neck main body 21. This configuration suppresses a significant increase in bulk of the buffer member 10, while suppressing a decrease in the contact area of the buffer member 10 with the filler neck main body 21. This accordingly suppresses interference of the buffer member 10 with members (not shown) placed in the neighborhood of the buffer member 10.

In the fuel supply device 500, the buffer member 10 includes the main, body portion 100 placed between the filler neck main body 21 and the fuel vapor port 22, and the cover portion 200 provided to cover the opposite side of the fuel vapor port 22 that is opposed to the side facing the filler neck main body 21 and engaged with the main body portion 100. This configuration enhances the easiness of assembly, i.e., the workability in assembly in the process of assembling the buffer member 10 in the neighborhood of the branch portion 29. More concretely, this configuration achieves assembly of the buffer member 10 by the simple operation of placing the main body portion 100 between the filler neck main body 21 and the fuel vapor port 22, subsequently placing the cover portion 200 to cover the opposite side of the fuel vapor port 22 that is opposite to the side facing the filler neck main body 21, and engaging the main body portion 100 and the cover portion 200 with each other.

B. Second Embodiment

Figure 10:
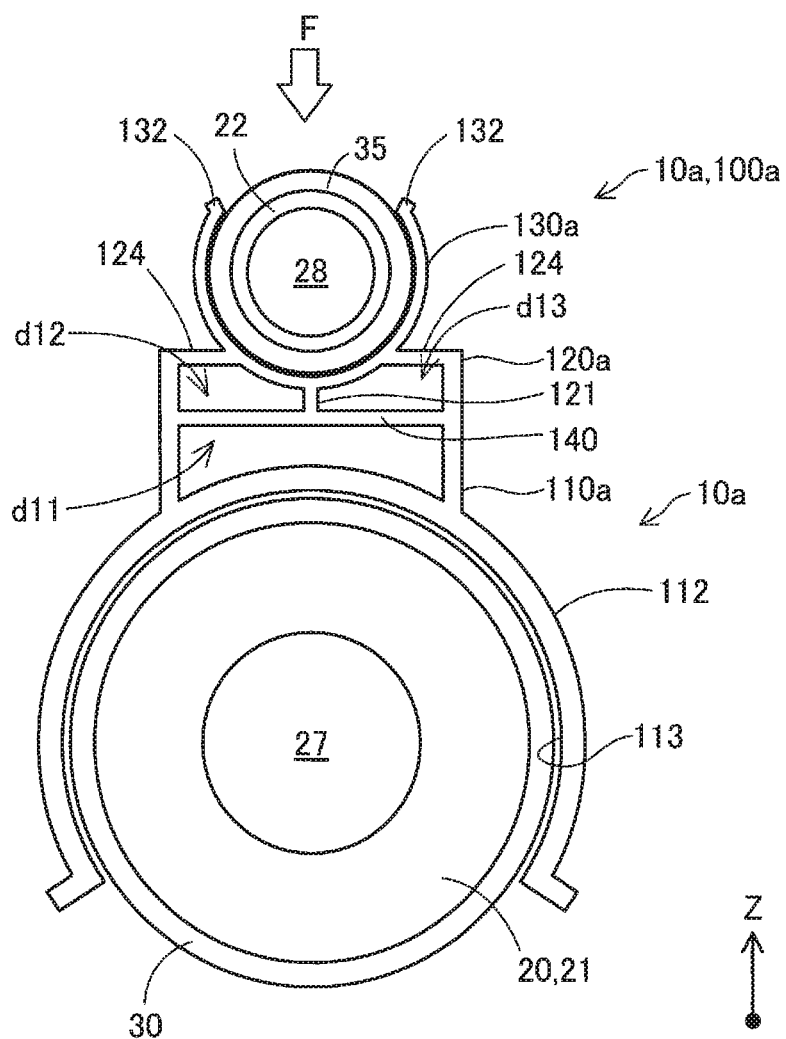
FIG. 10 is a sectional view illustrating the configuration of a buffer member according to a second embodiment.

FIG. 10 is a sectional view illustrating the configuration of a buffer member 10a according to a second embodiment. FIG. 10 illustrates a section of the buffer member 10a at a similar position to that of FIG. 9. FIG. 10 also illustrates sections of the fuel pipe 30 and the fuel vapor pipe 35, in addition to the section of the buffer member 10a. The shape of the internal passage 27 is schematically shown as a circular shape in FIG. 10.

A fuel supply device of the second embodiment differs from the fuel supply device 500 of the first embodiment by the buffer member 10a provided in place of the buffer member 10 but is otherwise similar to the fuel supply device 500. The buffer member 10a differs from the buffer member 10 of the first embodiment by omission of the cover member 200 and replacement of the main body portion 100 with a main body portion 100a. In other words, the buffer member 10a of the second embodiment is comprised of only the main body portion 100a.

The main body portion 100a includes a first base portion 110a, in place of the first base portion 110. The main body portion 100a also includes a second base portion 120a, in place of the second base portion 120.

The first base portion 110a has a significantly large bottom 112 that is placed to surround a wide range in the circumferential direction of the filler neck main body 21 and hold the fuel vapor port 22. More specifically, the bottom 112 of the first base portion 110a has a cylindrical shape with a cutout along the axis line as the approximate external shape. The cutout is approximately one third the entire circumference. The length of the bottom 112 along the axis line ax1 is approximately equal to the length of the bottom face 111 along the axis line ax1 according to the first embodiment. The bottom 112 is arranged to surround approximate two thirds in the circumferential direction of the outer circumferential surface of the filler neck main body 21 and is supported by the filler neck 20 to hold the filler neck main body 21. An inner circumferential surface 113 of the bottom 112 is formed as a curved surface along the outer circumferential surface of a portion of the filler neck main body 21 to which the buffer member 10 is mounted, like the bottom face 111 of the first embodiment. The thickness of the bottom 112 is approximately equal to the thickness of the remaining part of the first base portion 110a. The bottom 112 has high elasticity, such that its opening portion is readily extendable. The first base portion 110a has a first recess d11 that is formed therein, like the first base portion 110 of the first embodiment. The first recess d11 of the first base portion 110a has a different shape from that of the first recess d1 of the first base portion 110 according to the first embodiment but has similar functions to those of the first recess d1 of the first base portion 110.

The second base portion 120a differs from the second base portion 120 of the first embodiment by the configuration that the second base portion 120a is arranged to be continuous with the fuel vapor port support portion 130 via a joint wall portion 124 in addition to the rib 121 and that the engagement holes 123 are omitted. Otherwise the configuration of the second base portion 120a is similar to the configuration of the second base portion 120 of the first embodiment. The like components are expressed by the like reference signs, and their detailed description is omitted.

The joint wall portion 124 forms a ceiling portion of the second base portion 120a and is arranged to be continuous with a lower side face of the fuel vapor port support portion 130. This configuration causes part of the force transmitted to the fuel vapor port support portion 130 to be transmitted to the second base portion 120a through the joint wall portion 124 in addition to the rib 121.

The second base portion 120a has a second recess d12 and a third recess d13, which differ from the second recess d2 and the third recess d3 of the first embodiment by that the second recess d12 and the third recess d13 are defined by the joint wall portion 124, in addition to the rib 121, the wall portion 140 and the fuel vapor port support portion 130.

In the fuel supply device of the second embodiment having the above configuration, when an external force F is applied to the neighborhood of the branch portion 29 like the first embodiment, the fuel vapor port 22 located on a most +Z-direction side receives the external force F. Part of the external force F applied to the fuel vapor port 22 is transmitted to the fuel vapor port support portion 130, the second base portion 120a, the first base portion 110a and the filler neck main body 21 in this sequence. The presence of the three recesses d11, d12 and d13 provided in the buffer member 10a of the second embodiment provides high elasticity of the buffer member 10a and causes the external force to be absorbed by the buffer member 10a. Unlike the first embodiment, however, the buffer member 10a does not include the cover portion 200. The configuration of the second embodiment is thus likely to cause a larger total force to be transmitted to the filler neck main body 21, compared with the configuration of the first embodiment. The bottom 112 of the first base portion 110a is, however, arrange to cover approximately two thirds in the circumferential direction of the outer circumferential surface of the filler neck main body 21. This provides a significantly large contact area of the buffer member 10a with the filler neck main body 21. The force applied to the unit area of the filler neck main body 21 in the configuration of the second embodiment is approximately equal to or even smaller than the applied force in the configuration of the first embodiment.

The fuel supply device of the second embodiment described above has similar advantageous effects to those of the fuel supply device 500 of the first embodiment. Additionally, the absence of the cover portion 200 facilitates mounting of the buffer member 10a to the filler neck 20.

C. Modifications

C1. Modification 1:

According to the first embodiment, the buffer member 10 includes the three recesses d1 to d3. According to a modification, at least one of these recesses may be omitted. The number of recesses may not be necessarily limited to three but may be any number of recesses. In a configuration. including only one recess, the rib 121 is omitted. Similarly, according to the second embodiment, the buffer member 10a includes the three recesses d11 to d13. According to a modification, at least one of these recesses may be omitted. The number of recesses may not be necessarily limited to three but may be any number of recesses. The respective recesses d1 to d3 or d11 to d13 have the openings that are formed on the respective sides furthest away from the branch portion 29 along the direction parallel to at least one of the axis line ax1 of the filler neck main body 21 and the axis line ax2 of the fuel vapor port 22. The openings may, however, be formed on other sides.

C2. Modification 2:

According to the respective embodiments, the rib 121 has the surface that is parallel to the plane including the axis line ax1 of the filler neck main body 21 and the axis line ax2 of the fuel vapor port 22. The rib 121 may have a surface extended in another direction, in place of this surface or in addition to this surface.

C3. Modification 3:

According to the first embodiment, the surface 111 of the buffer member 10 that adjoins to the filler neck main body 21 is formed as the curved surface along the outer circumferential surface of the portion of the filler neck main body 21 to which the buffer member 10 is mounted. The present disclosure is, however, not limited to this configuration. The surface 111 may be formed in any shape that adjoins to the outer circumferential surface of the portion of the filler neck main body 21 to which the buffer member 10 is mounted. Similarly, the inner circumferential surface 113 of the bottom 112 of the buffer member 10a according to the second embodiment may be formed in any shape that adjoins to the outer circumferential surface of the portion of the filler neck main body 21 to which the buffer member 10a is mounted.

C4. Modification 4:

According to the respective embodiments, the end of the main body portion 100 or 100a furthest away from the branch portion 29 along the axis line ax1 of the filler neck main body 21 is located at the position further from the branch portion 29 along the axis line ax1, compared with the seal member 26. According to a modification, this end of the main body portion 100 or 100a may be located at a position of an equal distance from the branch portion 29 along the axis line ax1 to that of the seal member 26 or may be located at a nearer position compared with the seal member 26.

C5. Modification 5:

According to the first embodiment, the buffer member 10 has the trapezoidal shape as the approximate external shape when being viewed in the direction parallel to the axis line ax1 of the filler neck main body 21. The approximate external shape of the buffer member 10 may, however, not be necessarily limited to the trapezoidal shape but any arbitrary shape.

The disclosure is not limited to any of the embodiments and the modifications described above but may be implemented by a diversity of other configurations without departing from the scope of the disclosure. For example, the technical features of any of the embodiments and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented by any of the aspects described below.

According to one aspect of the present disclosure, there is provided a fuel supply device configured to supply a fuel to a fuel tank. The fuel supply device comprises a filler neck provided to include a fuel supply port which a fueling gun is inserted in and configured to form part of a fuel passage from the fuel supply port to the fuel tank, wherein the filler neck comprises a filler neck main body including an internal passage that forms part of the fuel passage, and a fuel vapor port branched off from the filler neck main body to communicate with the internal passage of the filler neck main body; a fuel vapor pipe connected with the fuel tank and with the fuel vapor port and configured to supply a fuel vapor in the fuel tank to the internal passage of the filler neck main body; and a buffer member at least partly placed between the filler neck main body and the fuel vapor port in a neighborhood of a branch portion where the fuel vapor port is branched off from the filler neck main body.

The fuel supply device of this aspect is provided with the buffer member at least partly placed between the filler neck main body and the fuel vapor port in the neighborhood of the branch portion where the fuel vapor port is branched off from the filler neck main body. When an external force is applied to the fuel vapor port, this configuration enables part of the external force to be absorbed by the buffer member and to be transmitted to the filler neck main body. This configuration accordingly suppresses plastic deformation of the fuel vapor port and damage of the branch portion.

In the fuel supply device of the above aspect, the buffer member may include a recess that is open on a side furthest away from the branch portion along a direction parallel to at least one of an axis line of the filler neck main body and an axis line of the fuel vapor port. In the fuel supply device of this aspect, the buffer member includes the recess that is open on the side furthest away from the branch portion along at least one of the axis line of the filler neck main body and the axis line of the fuel vapor port. This configuration enhances the elasticity of the buffer member and causes the buffer member to more readily absorb the applied external force, compared with a configuration without the recess. This more effectively suppresses plastic deformation of the fuel vapor port and damage of the branch portion.

In the fuel supply device of the above aspect, the buffer member may include a plurality of the recesses, and the buffer member may further include a rib arranged to part the plurality of recesses from each other. In the fuel supply device of this aspect, the buffer member includes the plurality of recesses parted from each other by the rib. This configuration enhances the rigidity of the buffer member and causes the buffer member to more readily transmit the applied force to the filler neck main body compared with a configuration having a single recess of a volume that is equal to the total volume of void spaces formed by the plurality of recesses. This accordingly enables the force to be absorbed by the buffer member, while suppressing damage of the buffer member. Additionally, the presence of the rib facilitates molding of the buffer member.

In the fuel supply device of the above aspect, the rib may include a surface that is parallel to a plane including the axis line of the filler neck main body and the axis line of the fuel vapor port. In the fuel supply device of this aspect, the rib has the surface parallel to the plane including the axis line of the filler neck main body and the axis line of the fuel vapor port. This configuration causes the applied force to be more readily transmitted to the filler neck main body.

In the fuel supply device of the above aspect, the buffer member may include a contact surface that is arranged to come into contact with the filler neck main body and that is formed as a curved surface along an outer circumferential surface of the filler neck main body. In the fuel supply device of this aspect, the buffer member has the contact surface formed as the curved surface along the outer circumferential surface of the filler neck main body. This configuration increases the contact area of the buffer member with the filler neck main body and enables the applied force to be transmitted to the wide range of the filler neck main body, compared with a configuration including a contact surface that is not formed as a curved surface, for example, a planar contact surface of the same area. This accordingly suppresses the filler neck main body from being damaged by the locally transmitted force.

The fuel supply device of the above aspect may further comprise a fuel pipe configured to form part of the fuel passage and to receive an opposite end of the filler neck main body that is opposite to an end where the fuel supply port is formed and that is inserted in the fuel pipe; and an annular seal member placed along an outer circumferential surface of the opposite end of the filler neck main body inserted in the fuel pipe to seal between the filler neck main body and the fuel pipe. An end of the buffer member furthest away from the branch portion along the axis line of the filler neck main body may be located at a position further away from the branch portion along an axis line of the filler neck main body, compared with the seal member. In the fuel supply device of this aspect, the end of the buffer member furthest away from the branch portion along the axis line of the filler neck main body is located at the position further away from the branch portion along the axis line of the filler neck main body, compared With the seal member. This configuration enables the portion of the filler neck main body with the seal member placed on its outer circumferential surface to be covered by the buffer member and thereby suppresses this portion from being damaged by application of an external force. This accordingly suppresses reduction in the sealing property between the filler neck main body and the fuel vapor port.

In the fuel supply device of the above aspect, the buffer member may have a trapezoidal external shape when being viewed in a direction parallel to an axis line of the filler neck main body. In the fuel supply device of this aspect, the buffer member has the trapezoidal external shape when being viewed in the direction parallel to the axis line of the filler neck main body. This configuration suppresses a significant increase in bulk of the buffer member, while suppressing a decrease in the contact area of the buffer member with the filler neck main body. This accordingly suppresses interference of the buffer member with members placed in the neighborhood of the buffer member.

In the fuel supply device of the above aspect, the buffer member may comprise a main body portion placed between the filler neck main body and the fuel vapor port; and a cover portion arranged to cover an opposite side of the fuel vapor port that is opposite to a side facing the filler neck main body, and engaged with the main body portion. The main body portion and the cover portion may be arranged to surround a whole circumference of the fuel vapor port in the neighborhood of the branch portion. In the fuel supply device of this aspect, the buffer member includes the main body portion placed between the filler neck main body and the fuel vapor port, and the cover portion provided to cover the opposite side of the fuel vapor port that is opposed to the side facing the filler neck main body and engaged with the main body portion. This configuration enhances the easiness of assembly, i.e., the workability in assembly in the process of assembling the buffer member in the neighborhood of the branch portion of the fuel vapor port. For example, this configuration achieves assembly of the buffer member by the simple operation of placing the main body portion between the filler neck main body and the fuel vapor port, subsequently placing the cover portion to cover the opposite side of the fuel vapor port that is opposite to the side facing the filler neck main body, and engaging the main body portion and the cover portion with each other.

The present disclosure may be implemented by various aspects other than the fuel supply device, for example, a buffer member, a vehicle equipped with the fuel supply device or a manufacturing method of the fuel supply device. The present disclosure may be implemented by aspects of a buffer member.

According to another aspect of the present disclosure, there is provided a buffer member used in a fuel supply device configured to supply a fuel to a fuel tank and equipped with a filler neck that is provided to include a fuel supply port which a fueling gun is inserted in and that is configured to form part of a fuel passage from the fuel supply port to the fuel tank. The filler neck comprises a filler neck main body including an internal passage that forms part of the fuel passage, and a fuel vapor port branched off from the filler neck main body to communicate with the internal passage of the filler neck main body.

This buffer member comprises a main body portion that includes a contact surface configured to come into contact with the filler neck main body and formed as a curved surface along an outer circumferential surface of the filler neck main body and that is placed and used between the filler neck main body and the fuel vapor port in the neighborhood of the branch portion where the fuel vapor port is branched off from the filler neck main body; and a cover portion arranged to cover an opposite side of the fuel vapor port that is opposite to a side facing the filler neck main body, and engaged with the main body portion. The main body portion and the cover portion may be arranged to surround a whole circumference of the fuel vapor port in the neighborhood of the branch portion.

What is claimed is:

1. A fuel supply device adapted to supply a fuel to a fuel tank, comprising:
   a filler neck provided to include a fuel supply port, which is adapted to receive a fueling gun, and configured to form part of a fuel passage from the fuel supply port, wherein the fuel passage is adapted to supply fuel to the fuel tank, and wherein the filler neck comprises a filler neck main body, which includes an internal passage that forms part of the fuel passage, and a fuel vapor port, which is branched off from the filler neck main body to communicate with the internal passage of the filler neck main body;
   a fuel vapor pipe connected with the fuel vapor port and adapted to supply a fuel vapor in the fuel tank to the internal passage of the filler neck main body; and
   a buffer member at least partly placed between the filler neck main body and the fuel vapor port in a neighborhood of a branch portion where the fuel vapor port is branched off from the filler neck main body, wherein
   the buffer member includes a main body portion and a cover portion that is engaged with the main body portion,
   in a state in which the main body portion and the cover portion are engaged with each other, a through hole is formed between the main body portion and the cover portion, and
   the fuel vapor port is inserted in the through hole.

2. The fuel supply device according to claim 1, wherein the buffer member includes a recess that is open on a side furthest away from the branch portion along a direction parallel to at least one of an axis line of the filler neck main body and an axis line of the fuel vapor port.

3. The fuel supply device according to claim 2, wherein the buffer member includes a plurality of the recesses, and the buffer member further includes a rib arranged to part the plurality of recesses from each other.

4. The fuel supply device according to claim 3, wherein the rib includes a surface that is parallel to a plane including the axis line of the filler neck main body and the axis line of the fuel vapor port.

5. The fuel supply device according to claim 1, wherein the buffer member includes a contact surface that is arranged to come into contact with the filler neck main body and that is formed as a curved surface along an outer circumferential surface of the filler neck main body.

6. The fuel supply device according to claim 1, further comprising:
   a fuel pipe configured to form part of the fuel passage and to receive an opposite end of the filler neck main body that is opposite to an end where the fuel supply port is formed and that is inserted in the fuel pipe; and
   an annular seal member placed along an outer circumferential surface of the opposite end of the filler neck main body inserted in the fuel pipe to seal between the filler neck main body and the fuel pipe,
   wherein an end of the buffer member furthest away from the branch portion along the axis line of the filler neck main body is located at a position further away from the branch portion along an axis line of the filler neck main body, compared with the annular seal member.

7. The fuel supply device according to claim 1, wherein the buffer member has a trapezoidal external shape when being viewed in a direction parallel to an axis line of the filler neck main body.

8. The fuel supply device according to claim 1, wherein the buffer member comprises:
   a main body portion placed between the filler neck main body and the fuel vapor port; and
   a cover portion arranged to cover an opposite side of the fuel vapor port that is opposite to a side facing the filler neck main body, and engaged with the main body portion, wherein
   the main body portion and the cover portion are arranged to surround a whole circumference of the fuel vapor port in the neighborhood of the branch portion.

* * * * *